United States Patent
Gao et al.

(10) Patent No.: US 8,938,164 B2
(45) Date of Patent: Jan. 20, 2015

(54) OPTICAL LINK AUTO-SETTING

(71) Applicants: Miaobin Gao, Saratoga, CA (US); Christine M. Krause, Boulder Creek, CA (US); Hui-Chin Wu, Cupertino, CA (US); Hengju Cheng, Mountain View, CA (US)

(72) Inventors: Miaobin Gao, Saratoga, CA (US); Christine M. Krause, Boulder Creek, CA (US); Hui-Chin Wu, Cupertino, CA (US); Hengju Cheng, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 132 days.

(21) Appl. No.: 13/631,273

(22) Filed: Sep. 28, 2012

(65) Prior Publication Data

US 2014/0093233 A1    Apr. 3, 2014

(51) Int. Cl.
*H04B 10/08*    (2006.01)
(52) U.S. Cl.
USPC .......... 398/16; 398/25; 398/26; 398/27; 398/33; 398/38; 398/135; 398/136; 398/137
(58) Field of Classification Search
CPC .... H04B 10/40; H04B 10/43; H04B 10/0771; H04B 10/0775; H04B 10/0779; H04B 10/0795; H04B 10/07953; H04B 10/0799
USPC .......... 398/16, 140, 141, 25, 26, 27, 33, 38, 398/23, 24, 135, 136, 22, 30, 31, 192, 193, 398/194, 195, 196, 197, 202, 208, 209, 182, 398/137, 138, 139, 158, 159
See application file for complete search history.

(56) References Cited

U.S. PATENT DOCUMENTS

| | | | |
|---|---|---|---|
| 6,549,310 B1 * | 4/2003 | Kuchta et al. | 398/16 |
| 7,058,299 B1 * | 6/2006 | Shah et al. | 398/27 |
| 7,263,287 B2 * | 8/2007 | Xu | 398/27 |

* cited by examiner

*Primary Examiner* — Hanh Phan
(74) *Attorney, Agent, or Firm* — Blakely, Sokoloff, Taylor & Zafman LLP

(57) ABSTRACT

A system includes two optical modules that perform auto-setting of the optical links between the optical modules. One optical module sends an optical signal with a test pattern to the other optical module. If the receiving module determines that the test pattern is successfully received, it sends a pass indication to the transmitting module, and the transmitting module can configure its driver path in accordance with a transmit current setting used to transmit the test pattern. If the test pattern is not successfully received, the receiving module sends a fail indication, and the transmitting module can increase the transmit current setting and resend the test pattern. When the system includes multiple optical channels, one channel can be tested while feedback is provided on another channel. The system can iterate through all optical channels until they are all configured.

12 Claims, 11 Drawing Sheets

OPTICAL LINK AUTO-SETTING

FIELD

Embodiments of the invention are generally related to optical systems, and more particularly to configuring an optical link.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright© 2012, Intel Corporation, All Rights Reserved.

BACKGROUND

There is an increased use of computing devices and other devices that generate ever-increasing amounts of data. Every time data is generated, it needs to be moved, stored, and processed to achieve the goal of creating it. Thus, the data is frequently shared between devices, and between components on the same device. Traditional device interconnections (both between devices and between components of the same device) are accomplished with electrical I/O (input/output) signaling. The performance of electrical I/O signaling is not keeping pace with the demand for performance increases in computing and data generating and/or consuming devices.

Photonic components find increasing use in computing devices, and can provide increases in performance for high speed data transfer. The optical interconnections are made via optical links between devices and/or components. One traditional drawback of optical signaling is that the optical components must be precisely configured to enable the link to function properly. Configuring the optical link has traditionally been performed by manual testing of the components that are part of the optical link. For example, the laser is traditionally tested for low-bit to high-bit performance, jitter specification compliance, and other performance indicators.

The testing is very time consuming and costly. Additionally, testing the individual components does not guarantee optimal performance of a complete link, given that there may be a mismatch among components which have all individually passed testing. Pre-configuring all components to guarantee worst-case interoperability wastes power in links with margin from higher power, better optical coupling, lower noise levels, or better performance. Training the optical link during link initialization or during data transmission guarantees acceptable performance while allowing for power savings in links with margin.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Figure 1:
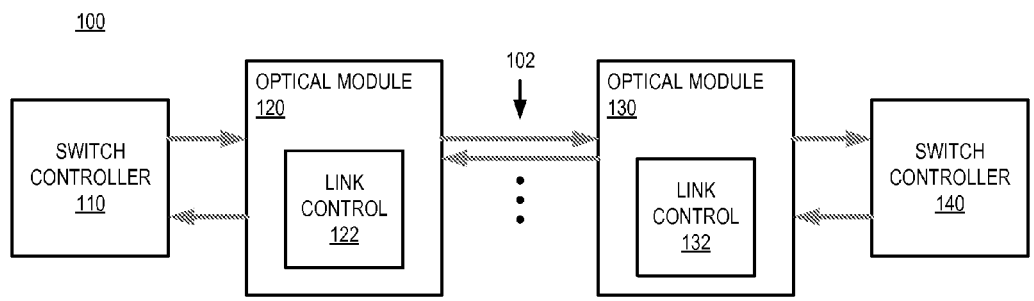
FIG. 1 is a block diagram of an embodiment of a system with optical modules that perform an auto-setting process to determine an optical setting configuration.

Descriptions of certain details and implementations follow, including a description of the figures, which may depict some or all of the embodiments described below, as well as discussing other potential embodiments or implementations of the inventive concepts presented herein.

DETAILED DESCRIPTION

As described herein, two optical modules coupled by one or more optical channels perform auto-setting of the optical links between the optical modules. For purposes of clarity herein the terms "channel" and "link" will be used separately. A channel refers herein to a bidirectional communication connection between two devices. A link as used herein refers to a unidirectional link from one optical module to another. Thus, a channel includes two links, each from a transmitter or driver of one optical module to a corresponding receiver of the other optical module. It will be understood that the use of these terms in a broader sense could have different meanings, or the meanings could even be swapped. Thus, the use of the terms herein is solely for simplicity in description and is not limiting.

The auto-setting refers generally to the optical modules performing a testing process to determine what configuration to use to drive each optical link. One optical module sends an optical signal with a test pattern to the other optical module. If the receiving module determines that the test pattern is successfully received, it sends a pass indication to the transmitting module, and the transmitting module can configure its driver path in accordance with a transmit current setting used to transmit the test pattern. If the test pattern is not successfully received, the receiving module sends a fail indication, and the transmitting module can adjust (e.g., increase) the transmit current setting and resend the test pattern. The adjusting of the transmit current setting and resending the test pattern can be repeated until a pass indicator is received as feedback from the receiving module. It is envisioned that the receiver may send back different indicators based on the type of failure to indicate to the transmitter what adjustments are needed.

In one embodiment, an optical system includes optical modules that include multiple channels. When the system includes multiple separate optical channels, one channel can be tested while feedback is provided on another channel. The optical modules can iterate through all links of all optical channels until they are all configured. Thus, rather than test only individual components of an optical module transmit or receive path (also referred to as a driver path and a receiver path), the optical modules test the entire link. Thus, variations in circuits can be accounted for when the optical module configures the link settings. Additionally, variations not only in lasers, but in high-speed circuit paths, fiber, connector coupling, and photodetectors can be accounted for with the auto-setting described herein.

It will be understood that in one embodiment, a lower initial current setting can be used than what has traditionally been used, and a sufficient current to provide a proper connection between two optical modules can be found that is less than what the current would traditionally be set to. For at least this reason, the auto-setting described herein can reduce a power consumption of an optical system, by reducing a laser setting. Thus, a proper connection can be achieved without over-driving or under-driving the laser. Additionally, the testing and programming of the optical modules and optical links can be accomplished in a matter of seconds versus tens of minutes for testing the operation of the laser manually as has been traditionally done.

FIG. 1 is a block diagram of an embodiment of a system with optical modules that perform an auto-setting process to determine an optical setting configuration. System 100 includes optical module 120 coupled to optical module 130 via one or more optical channels 102. In one embodiment, each optical channel 102 includes two links, one from the transmitter of optical module 120 to the receiver of optical module 130, and the other from the transmitter of optical module 130 to the receiver of optical module 120.

Optical modules 120 and 130 include, respectively, link control 122 and link control 132. Link control refers to logic, including hardware and software or other control logic, which enables the optical modules to perform auto-setting to set the configuration for an optical link of optical channels 102. In one embodiment, link control 122, 132 is implemented as a microcontroller. The auto-setting initiates at one of the optical modules 120, 130, and for purposes of the exchange, the optical module sending a test pattern can be considered the "near-end" module. The "far-end" module is the module receiving the test pattern. It will be understood that the modules can change roles as far-end and near-end for testing the different links.

Optical modules 120 and 130 as a near-end modules convert electrical signals to optical signals and transmit the optical signal over the fiber. Optical modules 120 and 130 as far-end modules receive and convert the optical signal back to electrical signal. Switch controllers 110 and 140 provide the electrical signals to be converted into optical signals when they are at the near-end, and they receive and process the electrical signals converted from optical signals at the far-end.

The near-end optical module sends an optical signal including a test pattern to the far-end optical module. In one embodiment, the optical signal is a low speed optical signal with a low speed pulse, as described in more detail below. In one embodiment, the optical signal is a high speed optical signal that is decoded at speed. In the case of a low speed optical signal, the test pattern can be a simple pattern (e.g., 101010 . . . ). In the case of a high speed optical signal, the test pattern can be extended to be easier to perform the test at speed, such as by using the same basic high-low pattern, but extending it to be multiples of the same bit (e.g., 1 . . . 10 . . . 01 . . . 1 . . . 0 . . . ). It will be understood that different patterns can be used.

The far-end optical module receives and tests the optical signal. If the optical signal passes, the far-end optical module sends back a pass indicator. In one embodiment, the far-end optical module indicates the pass indicator by holding the return optical link high (sending a '1' for a period of time or until acknowledged by the near-end optical module). Alternatively, the far-end optical module can send a bit pattern to indicate the test passed. If the optical signal fails the test (e.g., by not being received correctly), the far-end optical module sends back a fail indicator. In one embodiment, the fail indicator is simply holding the return optical link low (sending a '0' for a period of time or until acknowledged by the near-end optical module). In one embodiment, the far-end optical module generates a bit pattern that indicates the test failed. In one embodiment, the far-end optical module generates a change indication pattern that directs the transmitter to change a specific setting in a certain way, such as increase modulation current, increase "0" bit current, lower the duty-cycle distortion level, or other indications. It will be understood that a zero could be the baseline signal generated on one of the links, with a one being a higher-level of light modulated onto the baseline, threshold value (see FIGS. 2A and 2B below). Thus, it could make sense for a zero to be a fail indicator, where the near-end modulator can continue to send test signals and wait until a one comes back from the far-end indicating that the signal was properly received. However, other implementations are possible.

When the near-end module detects a pass indicator at the near-end receiver, the near-end module can configure its driver, including its laser, for communication based on the configuration settings used to send the test pattern that resulted in the pass indicator. The settings of interest can include duty-cycle distortion, signal amplitude, and eye mask opening. The amplitude can be tested by a simple amplitude detection test. The duty-cycle distortion can be tested by decoding a series of signal bit transitions. The eye mask can be tested by sweeping a sampling point in amplitude and time. Such tests and others that will be understood by those skilled in the art can be used by the far-end module to determine if the settings used by the near-end module meet expected optical specifications. When the specifications are met, the near-end module configures its transmitter or the driver path, including the laser device with the settings.

In one embodiment, multiple channels are used in parallel to perform auto-setting. For example, the near-end module can send a test signal or a signal including a test pattern on one channel, and receive feedback from the far-end module on a different channel. Auto-setting could also be done over just one channel. Sending training on one link and the feedback on another link in the same channel.

In one embodiment, each optical channel 102 provides a 10 Gb/s I/O (input/output) connection. Alternatively, each optical channel can provide 25 Gb/s or some other datarate connection. There can be a variety of different configurations that could perform the link auto-setting described herein. For example, there can be any number of combinations of channel bandwidth and number of channels. For example, a 10 GbE physical datalink can be achieved with a 1×10 Gb/s channel. A 40 GbE physical datalink can be achieved with 4×10 Gb/s channels. A 100 GbE physical datalink can be achieved with 10×10 Gb/s channels or 4×25 Gb/s channels. Other arrangements are also possible.

System 100 can be incorporated into consumer electronics such as computers, televisions, entertainment systems, audio components, or other devices. The entire optical physical link includes optical modules 120 and 130, channels 102 over physical optical medium (e.g., fiber), as well as switch controllers 110 and 140. Switch controllers 110 and 140 typically initiate and finish a handshake process between optical modules 120 and 130 and control the power states. As described herein, with link control 122, 132, optical modules 120 and 130 can perform the handshake process as well as place the optical module in different power management states, such as into and out of active mode.

Figure 2A:
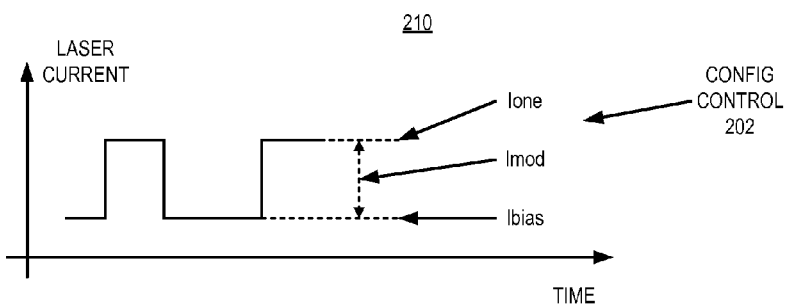
FIG. 2A is a diagram of an embodiment of an optical path current signaling, where an optical module can adjust the signaling via auto-setting.

FIG. 2A is a diagram of an embodiment of an optical path current signaling, where an optical module can adjust the signaling via auto-setting. The driver path as referred to herein can include all parts of the transmitter. The driver path could also just refer to the driver and predriver stages. In one embodiment, an optical module's transmitter (such as in optical modules 120 and 130 of system 100) use a laser driver to drive a VCSEL (vertical cavity surface emitting laser) to generate optical signals. A typical VCSEL uses two current settings: bias current (Ibias) and modulation current (Imod). Ibias is the current that sets the laser above the threshold current (see FIG. 2B), and the light output at Ibias corresponds to logic '0'. Ione is the sum of Imod+Ibias, and the light output at Ione corresponds to logic '1'. Graph 210 illustrates laser current versus time when a signal is sent. In the graph, Ibias is shown as a baseline level somewhere above zero laser current, and Ione is at a value of laser current Imod above Ibias.

In one embodiment, configuration control 202 is a signal provided by a control logic component of an optical module to adjust Imod (and therefore adjust Ione). Imod can initially be set to a lowest-value or default lowest modulation current. This current is summed with Ibias to drive the laser. The auto-setting between the optical modules can determine how much Imod needs to be raised to provide a proper optical signal to the complementary optical module.

Figure 2B:
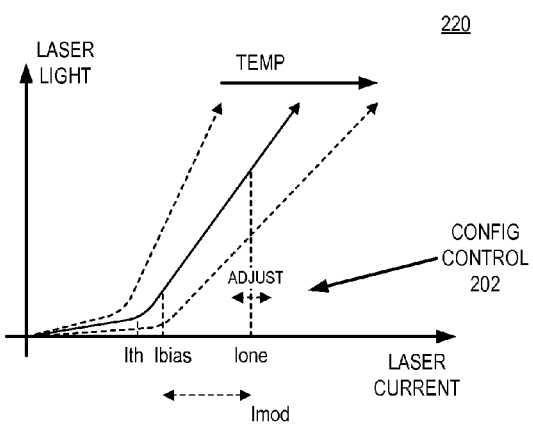
FIG. 2B is a diagram of an embodiment of an optical path current curve, where an optical module can adjust operation with respect to the curve via auto-setting.

FIG. 2B is a diagram of an embodiment of an optical path current curve, where an optical module can adjust operation with respect to the curve via auto-setting. Graph 220 illustrates a light-current curve. In graph 220, there is a certain current level below which very little laser light is generated. That level is Ith (the threshold current), after which laser light generation increases exponentially with increased current. Graph 220 provides an alternate view of the relationship of the current discussed with reference to graph 210. Ibias is a value above Ith, somewhere after the "knee" in the light-current curve, characteristic to the laser device. Ione is Imod higher than Ibias. Configuration control 202 can adjust where on graph 220 will sit, based on feedback at the near-end optical module from the far-end optical module.

A typical VCSEL's light-current curve varies with temperature, as illustrated by the dashed-line versions of the light-current curve. It will be understood that the curves are not necessarily meant to be to scale. The light-current curve shifts to the right as temperature increases, which indicates that power efficiency decreases. Additionally, those of skill in the art recognize that light-current curves vary from laser device to laser device. Configuration control 202 is generated in response to the auto-setting between two optical modules, and can be used to set a configuration of the components of the optical link to accommodate for variations such as those identified above. In one embodiment, configuration control 202 is digital programming control provided in response to measuring an optical test signal. Contrast the time and cost required for auto-setting of the links with measuring an optical output eye diagram and programming the laser, as has traditionally been done.

Figure 3:
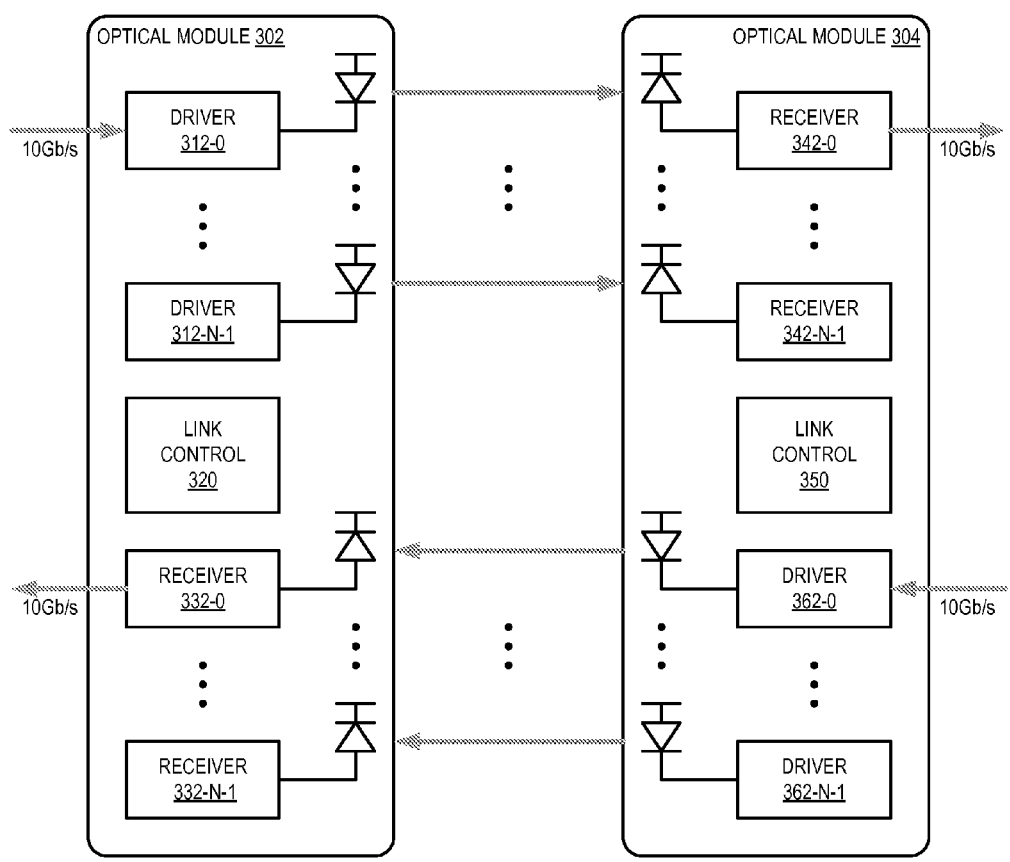
FIG. 3 is a block diagram of an embodiment of a system with optical modules that use one channel in performing auto-setting for another channel.

FIG. 3 is a block diagram of an embodiment of a system with optical modules that use one channel in performing auto-setting for another channel. System 300 provides an example of an N×10G optical connection. Optical modules 302 and 304 each have N laser drivers (312-0 through 312-(N−1) and 362-0 through 362-(N−1)) and N receivers (332-0 through 332-(N−1) and 342-0 through 342-(N−1)). Drivers 312-0 through 312-(N−1) are connected to receivers 342-0 through 342-(N−1), and drivers 362-0 through 362-(N−1) are connected to receivers 332-0 through 332-(N−1).

Optical module 302 includes link control 320, and optical module 304 includes link control 350. The link control can include link handshaking and auto-setting capabilities. Thus, the optical modules can be configured to perform auto-setting and handshaking. In one embodiment, link control 320 and 350 include a microcontroller or other control logic to implement the auto-setting. The auto-setting is automated in that the optical modules perform the process without requiring manual operations to send a signal or adjust a setting. Rather, the devices themselves perform the generation of the test signal, the testing of the signal, and making adjustments and setting configuration based on the results of the testing. In one embodiment, link control 320 and 350 implement a testing protocol exchange designed to implement the testing.

The drivers represent driver or transmit paths that include hardware components to drive the laser devices shown. In normal high-speed operation, optical module 302 receives a communication signal (illustrated as incoming signal line 10 Gb/s), which it converts to drive the laser to generate a signal to optical module 304. Optical module 304 converts the optical signal to electrical, and provides the signal to processing components (as illustrated by outgoing signal line 10 Gb/s). In auto-setting, a driver path (e.g., driver 312-0) generates an optical signal with a test pattern, and sends the test pattern in accordance with a current setting for the laser. A corresponding receiver (e.g., receiver 342-0) receives the signal at a light detection device (e.g., photodiode), and processes the signal with processing components.

The receiving optical module generates a pass/fail indicator or adjustment indicator in response to the incoming signal with test pattern. In one embodiment, logic in the receive path itself (e.g., in receiver 342-0) generates the indicator. In one embodiment, receiver 342-0 simply provides measurements to link control 350, which then generates a pass/fail or adjustment indicator. In one embodiment, portions of the driver path and/or the receiver path are considered part of the link control of an optical module. The receiving optical module, via its link control (e.g., link control 350) sends the indicator on a return link to the sending optical module. The return link can be a link associated with the same or a different optical channel. For example, in response to a test signal sent from driver 312-0 to receiver 342-0, optical module 304 can send feedback from driver 362-1 to receiver 332-1, where the number after the dash is the channel number (e.g., 0, 1, . . . N−1).

If the indicator indicates a pass, the optical module configures the driver in accordance with the settings used. For example, link control 320 can either configure driver 312-0, or pass information to driver 312-0 that will cause driver 312-0 to configure itself for the current settings used. If the indicator indicates a fail, the driver (e.g., driver 312-0 in conjunction with, or via, link control 320) can increase a transmit current setting and resend the test signal. The transmit current setting can be an amplitude (e.g., a value of Imod), a duty cycle, or some other setting.

In one embodiment, the connection between optical module 302 and optical module 304 can be auto-set with transmitters or drivers from both optical modules sending a training pattern to the other. Thus, optical module 302 can send a test pattern to optical module 304 via driver 312-0, while optical module 304 can send a test pattern to optical module 302 via driver 362-0, 362-1, or some other driver. Thus, in one embodiment, the two optical modules perform auto-setting of their transmitters. In one embodiment, optical module 302 sends the test pattern to optical module 304, which receives and modifies the test pattern to send it back to optical module 302. The modification can include information to indicate whether the test signal passed, and/or what failure occurred, and/or what optical module 302 should do to adjust its transmitting. In one embodiment, the far-end module can indicate if the setting by the near-end module should be increased or decreased, depending on the setting(s) being tested.

In one embodiment, the auto-set test pattern can be provided as a low-speed optical signal (at least an order of magnitude slower than communication operating speed). In an alternate embodiment, the auto-set pattern is provided at line-rate, or at a speed typically used by the transceiver for communication. In an embodiment where the test pattern is a high-speed signal, the test pattern can still be generated within the optical module. For example, optical module 302 is shown receiving a 10 Gb/s signal (e.g., a high-speed signal) from outside the module. Optical module 302 could receive such a signal as a data signal used in communication with optical module 304. Optical module 302 could also generate a 10 Gb/s test pattern signal with optical module 302, and send the test signal to optical module 304 for auto-setting.

Additionally, most of the discussion in system 300 centered on auto-setting the settings of the drivers (the transmitter side of the optical link). In one embodiment, receivers 332-0 to 332-(N−1) and 342-0 to 332-(N−1) could include one or more mechanisms to optimize the settings of the receive paths. In one embodiment, receiver auto-setting can occur after auto-setting of the transmitters is complete. It will be understood that "optimize" does not necessarily mean an absolute optimum, but can be used relative to specific conditions and within accepted tolerances and at resolution consistent with the configuration.

Figure 4:
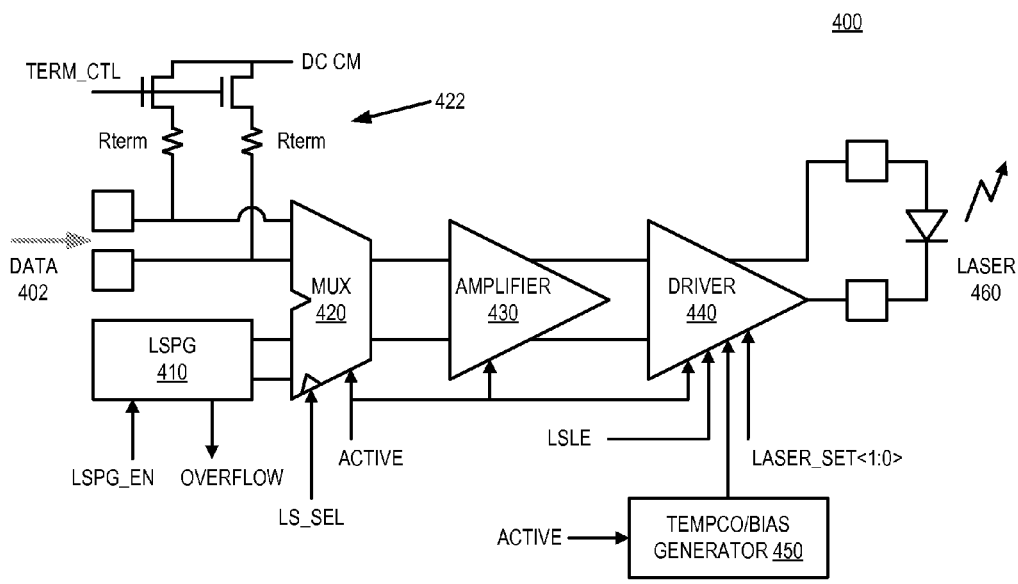
FIG. 4 is a block diagram of an embodiment of an optical module transmitter.

FIG. 4 is a block diagram of an embodiment of an optical module transmitter. Transmitter 400 illustrates one embodiment of a transmit path or a driver path in accordance with any embodiment described herein. Transmitter 400 includes multiplexer (mux) 420, gain stage (amplifier 430), laser driver 440, and laser 460. Transmitter 400 receives an electrical signal (data 402) and generates an optical signal to transmit the data optically. When the signal "Active" is high, the high-speed path is powered up and active. When the Active signal is low, it will set the laser driver in low-power standby state. Active is an input to mux 420, amplifier 430, driver 440, and tempco/bias generator 450 (discussed in more detail below).

In one embodiment, transmitter 400 is designed with a low-speed signal path multiplexed into the transmit path with high-speed (or operational speed) components. Thus, mux 420 can take as input either high-speed data 402, or a signal from LSPG (low-speed pattern generator) 410. In one embodiment, transmitter 400 uses LSPG 410 to generate a low-speed optical signal with test pattern for testing the optical link during auto-setting. Alternatively, transmitter could receive the signal from an external source. In one embodiment, LSPG 410 is considered part of control logic outside the transmitter path. In one embodiment, LSPG 410 is a logic device that can receive an enable signal (LSPG_en) to cause it to generate the low-speed signal. For example, the low-speed signal can have a data rate of 500 Mb/s and include a special data pattern (e.g., "1010 . . . "). The overflow signal can provide feedback to a link controller about operation of LSPG 410.

In one embodiment, data 402 is received at an input path with input termination circuit 422. Such an input termination can enable tunneling certain signals through. For example, in one embodiment, circuit 422 enables tunneling through a PCIe (peripheral component interconnect express) electrical signal. If a PCIe source directly drives transmitter 400, Rterm (termination resistors) can be set to 50 Ohm. The termination resistance can be connected or disconnected from a DC common-mode (DC CM) node for PCIe to detect if the link is present or not present, respectively. In one embodiment, during the link handshaking process, the switches controlled by "term_ctl" are open, which indicates to the PCIe driver that the link is not ready yet. After the optical link handshaking and auto-setting process is finished and the link is active (e.g., Active is enabling the components), the switches can be turned on. Turning on the switches can indicate to the PCIe driver that the link is present and ready for data transmission. Circuit 422 could be modified to extend the direct driving or tunneling concept to other protocols, such as QPI (QuickPath Interconnect), Infiniband, or others.

Mux 420 is controlled by LS_sel (low-speed signal select) to put data 402 through the transmit path, or a low-speed signal. In one embodiment, a high-speed signal is used to test the optical link, and that high-speed signal can be received as data 402. Mux 420 is coupled to amplifier 430, which provides gain to the signal in preparation to use the signal to drive the optical component (laser 460). Amplifier 430 drives driver 440.

Driver 440 includes circuitry for driving laser 460. Driver 460 provides a bias current to laser 460, and modulates the signal to generate an optical version of the data signal (either data 402, or an LSPG signal). Tempco (temperature coefficient) and bias generator 450 creates the bias and modulation current reference for the laser. Tempco refers to a temperature coefficient that can adjust the operation of laser 460 in accordance with what is shown in FIG. 2B. LSLE (low speed laser enable) is a low-speed pulse signal, through which driver 440 can drive laser 460 to generate the same low-speed pulse optical signal, which can be used for a link handshaking process. LSLE can be considered a control for a "flashlight" mode of the laser transmitter, which refers to a low-speed mode of transmitter 400 that can be used to test the light output operation of the transmitter.

It will be understood that after a receiver (such as receiver 500 discussed below) receives and processes a test signal, a far-end transmitter is used to communicate the result of the test back to the near-end module. The result is sent back as an indicator. Thus, transmitter 400 can send test patterns for testing a link, as well as sending indicators to a module on the other end of a link. In one embodiment, the LSLE signal can be used by transmitter 400 to send an optical low-speed protocol over a low-speed optical pulse (LSOP). The low-speed protocol can enable transmitter 400 to communicate a direction and parameter to modify, based on processing the results of the test by the receiver. Alternatively, transmitter 400 can send a simple high-low signal to indicate pass/fail. The more information sent by transmitter 400, the finer control of the laser setting can be indicated in the auto-setting process.

Laser_set<1:0> can provide a setting for driver 440 to use to drive laser 460. In one embodiment, laser_set<1:0> is generated by logic (e.g., a link controller) in response to feedback from a far-end optical module indicating whether the settings of a test signal were correct. Tempco/bias generator 450 can likewise adjust settings in response to the feedback from a complementary optical module. Thus, the operation of driver 440 is adjusted to modulate laser 460 harder or softer to produce an output signal that results in successful signal receipt at the far end.

Figure 5:
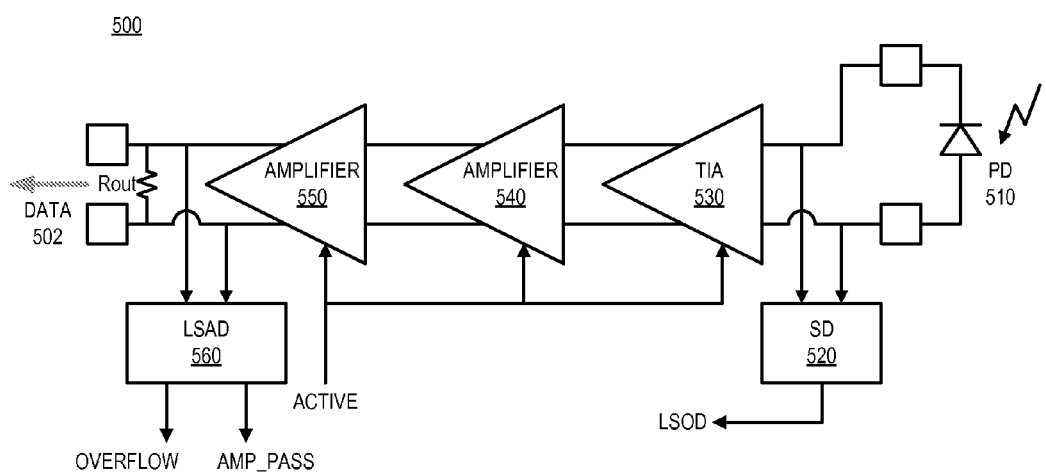
FIG. 5 is a block diagram of an embodiment of an optical module receiver.

FIG. 5 is a block diagram of an embodiment of an optical module receiver. Receiver 500 illustrates one embodiment of a receiver path in accordance with any embodiment described herein. Receiver 500 includes photodiode (PD) 510 or other light-sensitive device, TIA (transimpedance amplifier) 530, one or more gain stages (amplifier) 540, 550, and LSAD (low speed amplitude detector 560. Receiver 500 receives an optical signal at PD 510, and converts the optical signal in an electrical signal (data 502). When the signal "Active" is high, the receiver path is powered up and active. When the Active signal is low, it will set the receiver in low-power standby state. Active is an input to TIA 530, amplifier 540, and amplifier 550.

In one embodiment, receiver 500 includes SD (signal detect) 520. SD 520 asserts "LSOD" (low-speed optical detect) when there is an optical signal present at PD 510. SD 520 can detect a low-speed optical connect pulse when an optical cable is connected and the far-end laser is sending a pulse. In one embodiment, SD 520 performs signal detection on average current from PD 510. In one embodiment, detection of light by SD 520 indicates that receiver 500 registers a high. If the light is too low, receiver 500 registers a low. In one embodiment, receiver 500 includes an amplitude detector, and therefore the test does not necessarily need to be operated at low speed.

PD 510 converts the optical signal into an electrical current, and TIA 530 converts and amplifies the current signal into a voltage-based signal, which is then amplified by one or more gain stages. Thus, while amplifier 540 and amplifier 550 are shown, amplifier 540 is optional. The output of amplifier 550 is data output 502. In one embodiment, receiver 500 includes an output resistor, Rout, across the pads or terminals of the output.

In one embodiment, receiver 500 includes LSAD (low-speed amplitude detector) 560 coupled in parallel across the output. LSAD 560 can detect the receiver output amplitude. It will be understood that LSAD 560 or another testing component can be provided in different places in the receive path. Output amplitude detection can be used to test if the output can pass a preset amplitude threshold. Additionally, the amplitude detection can enable receiver 500 to test duty cycle and optical eye contour, or the shape of the eye formed by the optical signals. As mentioned above, the testing can operate with a low-speed signal, or can operate at operational speed. Additionally, receiver 500 can operate at a speed that is above a cutoff, but below operational speed. For example, receiver 500 could operate at 500 MHz, which is higher than the receiver low cut-off frequency (e.g., 300 KHz), but low enough to save the circuit power. The low-speed operation can occur at a low enough speed that is an order of magnitude lower than the operational speed. The low speed optical detect is LSOD. LSAD 560 can test the swing of the output signal generated by receiver 500.

In one embodiment, receiver 500 includes other circuitry to test the test signal. For example, in one embodiment, receiver 500 includes a duty cycle distortion detector (which can be anywhere in the receive path). The duty cycle distortion detector enables receiver 500 to detect and potentially identify distortion errors to a near-end optical module. As another example, in one embodiment, receiver 500 includes an average photodiode current detector that indicates an average current level to the near-end optical module. The more information gathered by receiver 500, the more detailed feedback can be provided. The information can be passed to link control logic, which can then pass it through a far-end transmitter to the near-end module. Such information could require the use of a more sophisticated protocol than a simple high or low return signal. In one embodiment, receiver 500 captures the test signal sent to it, and the link control modifies the captured test signal to send it back to the near-end module, where the modifications provide the information on what setting changes to make at the near-end.

It will be understood that transmitter 400 of FIG. 4 can operate with receiver 500 of FIG. 5. Transmitter 400 and receiver 500 can be the transmitters and receivers of optical modules that engage in auto-setting. In one embodiment, receiver 500 performs a handshake to see if transmitter 400 is plugged in. Transmitter 400 can then generate a test signal and monitor feedback from receiver 500 (for example, monitoring for zero or one on a feedback link), and adjust its transmitter settings until it is trained. Thus, the link performance is adjusted for the link itself (the actual connection) between the two optical modules, rather than testing optical output for high speed optical compliance. Eye safety can be assured by setting a preprogrammed limit not to exceed current that is used in conjunction with the "flashlight" mode.

Figure 6:
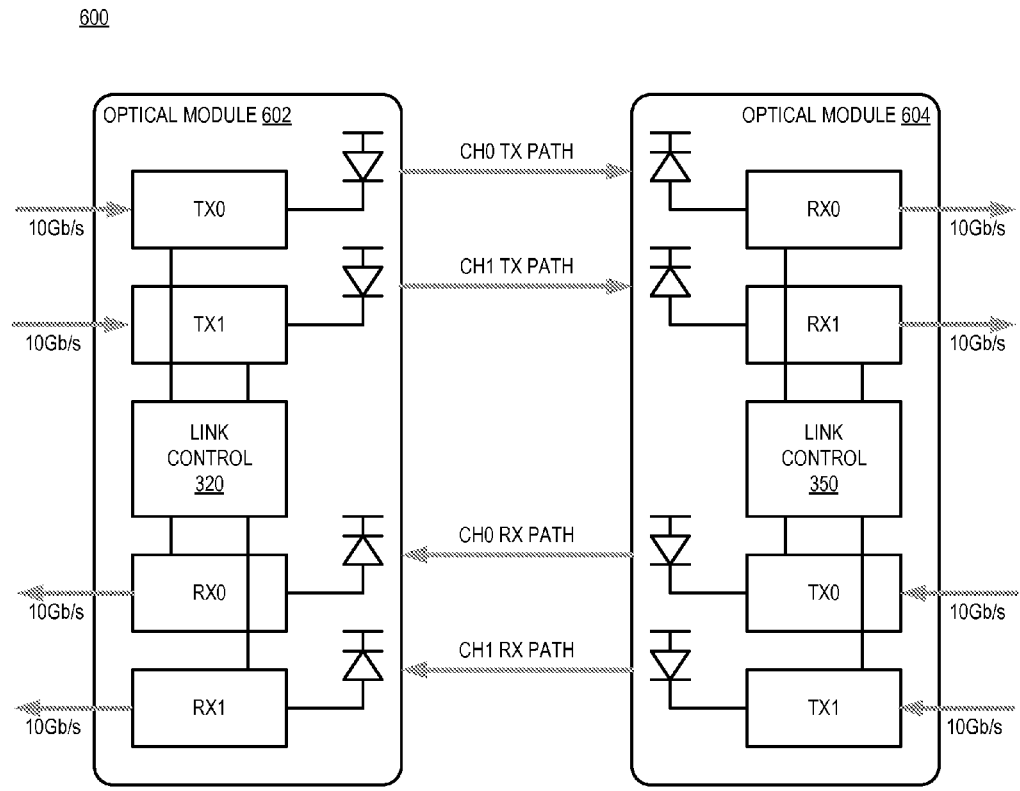
FIG. 6 is a block diagram of an embodiment of a system with optical modules and multiple optical paths that performs link auto-setting.

FIG. 6 is a block diagram of an embodiment of a system with optical modules and multiple optical paths that performs link auto-setting. System 600 is an optical system with far-end optical module 604 and near-end optical module 602 in accordance with any multi-channel embodiment described herein. For simplicity, only two channels are illustrated (Ch0 and Ch1), but more channels could be used. As described herein, optical modules 602 and 604 perform link auto-setting by exchanging an optical signal with test pattern and corresponding feedback in response to the test signal (optical signal with test pattern). Optical modules 602 and 604 include, respectively, link control 612 and 614 to manage the multiple channels and perform control functions related to the auto-setting.

In one embodiment, during the auto-setting process, near-end TX0 of module 602 sets a laser bias current at a minimum setting, which can be configured for each device, and which is some current above the threshold current. TX0 also sets a modulation current that is some configured level higher than the bias current. In one embodiment, module 602 sends a low-speed optical signal with a special pattern signal (e.g., 101010101010) through Ch0 transmitting (TX) path, to far-end RX0 of module 604.

In one embodiment, far-end RX0 uses an LSAD (e.g., LSAD 560 of system 500) to detect if the amplitude of the received and processed signal is high enough to pass a preset threshold. While an LSAD can be placed anywhere in the receiver path, placing the LSAD near the end of the path has an advantage of testing the receiver path (e.g., including the gain stages) to ensure that the signal is received correctly. If the test signal is received correctly, module 604 uses link control 614 to send back a pass indicator (e.g., a 'high') via far-end TX1 to near-end RX1, indicating on Ch1 that the Ch0 transmitting path is set correctly. If the test signal is not received correctly, module 604 uses link control 614 to send back a fail indicator (e.g., a 'low') via far-end TX1 to near-end RX1, indicating on Ch1 that the Ch0 transmitting path setting is incorrect or too low. In one embodiment, the fail indicator sent by module 604 causes module 602 to adjust or increase its laser setting. In one embodiment, in response to the fail indicator, module 602 determines that it should adjust or increase its laser setting. In either case module 602 repeats the test with the adjusted setting in response to the fail indicator. Modules 602 and 604 can repeat the sending the test signal and the feedback signal, and making adjustments to repeat the test until the test signal is properly received at far-end RX0 (e.g., RX0 receives a sufficient amplitude).

The testing and feedback can be on any combination of links from one optical module to the other. In one embodiment, multiple links can be tested at the same time. For example, the same, but reverse process described above could be performed in parallel to test the Ch0 receiving path. TX0 of module 604 can send a test signal to RX0 of module 602, which can test the signal for successful receipt and send feedback via TX1 of module 602. Link control 612 can manage the testing the in reverse direction. Thus, TX0 of module 602 and TX0 of module 604 can be tested in parallel. There could be benefit to perform the testing on both links in parallel. For example, there can be thermal condition advantages because in operation both links will typically be used together, which provides a different thermal environment than if only one link is operating. Additionally or alternatively, multiple channels could be performing testing in parallel (for example, if system 600 has more than two channels).

For example, in an embodiment with a 4×10G optical connection, there are four channels (Ch0-Ch3). The optical modules can perform auto-setting for Ch0 transmitting and receiving paths in parallel or sequentially. Additionally, in such an embodiment, the optical modules can perform auto-setting for Ch2 and Ch3 in parallel with Ch0 and Ch1, respectively. If the optical connection has only one channel (e.g. 1×10G), the auto-setting can be done by using the receiving path to feed back the transmitting path's pass/fail and fault signal, then swap the role for the receiving path's auto-setting. In an embodiment where a single channel is used, the auto-setting for the transmitting and receiving paths must be done sequentially, while in a system with multiple channels, the auto-setting for the transmitting and receiving paths can be done either sequentially or in parallel.

It will be understood that by starting at a default lowest current setting, the test can potentially reveal that the laser can be driven at a lower current than the default, while still providing an adequate link connection. Thus, link auto-setting can result in overall system power savings.

It will be understood that with optical signaling, the connection is provided by pure DC (direct current) coupling. Thus, unlike electrical connections, optical signaling can share low-speed and high-speed operation on the same link.

Figure 7:
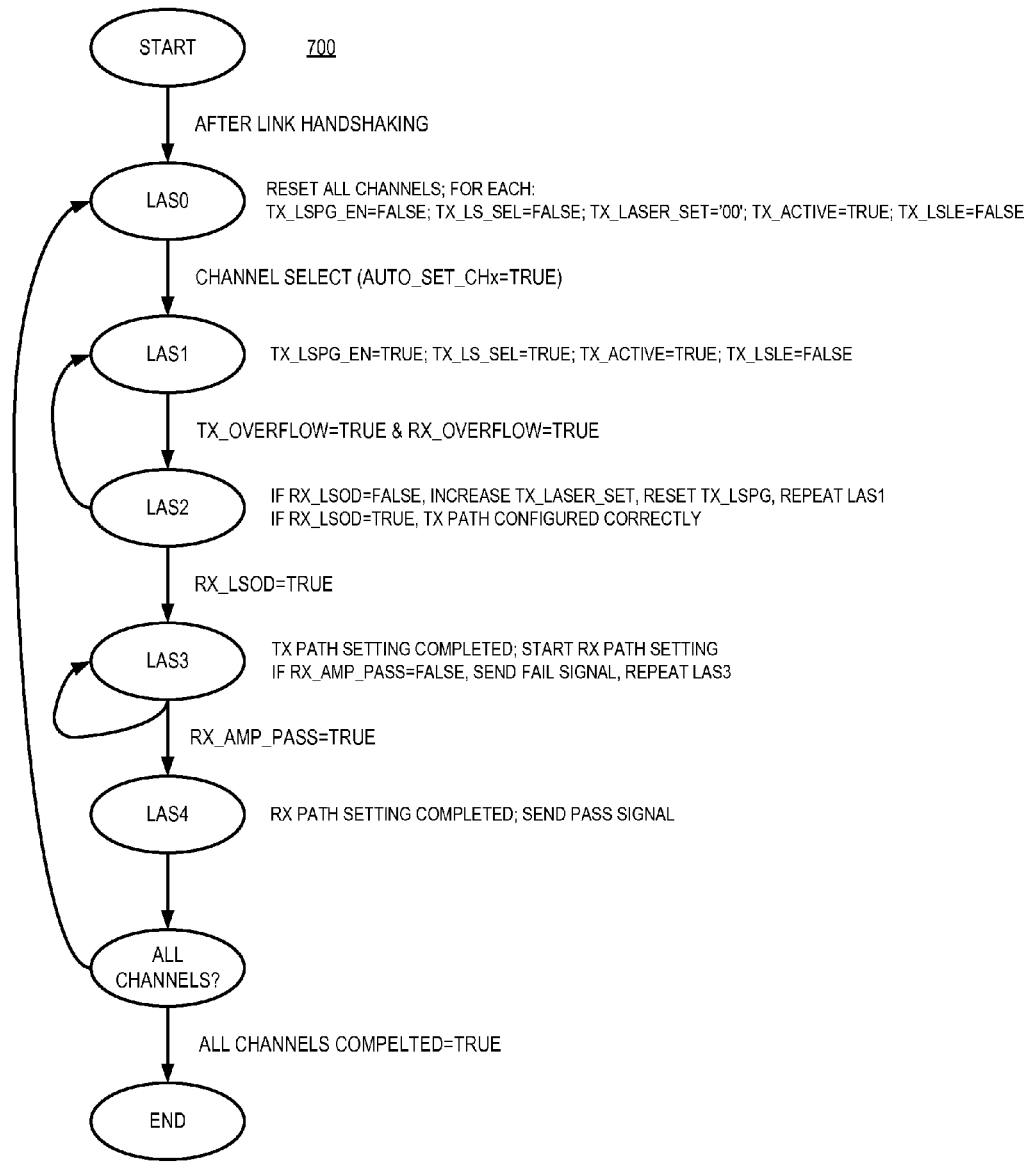
FIG. 7 is a flow diagram of an embodiment of an auto-setting logic state machine.

FIG. 7 is a flow diagram of an embodiment of an auto-setting logic state machine. State machine 700 provides one example of a flow of operation. Another view of a potential flow of operation is found in FIGS. 8A and 8B below. State machine 700 can be executed by any embodiment of an optical module described herein with a link controller, or embedded link control.

In one embodiment, after link handshaking, the state machine initiates at LAS0. The embedded link control or link control included in the optical module can reset all optical channels. For each channel, the link control can reset a low-speed pattern generator (TX_LSPG_en=FALSE), and reset a low-speed selection signal (TX_LS_SEL=FALSE). It will be understood that the designators 'FALSE' and 'TRUE' are used herein to refer to a setting that, respectively, disables and enables a signal or device. Resetting a signal or device refers to disabling or placing in a non-active state, while setting the signal or device refers to enabling or placing in an active state. The TRUE and FALSE designators can be generated by either a logic high or a logic low, depending on the configuration of the system. It is typical, though not necessary, for a logic low to correspond to a FALSE, and a logic high to correspond to a TRUE.

The link control can also set laser controls to a default operation (e.g., TX_laser_set='00'). The laser set signal can include more bits, depending on the device and system configuration. Additionally, different bit patterns can correspond to default operation. The link control can also reset a transmit low-speed pulse signal (e.g., TX_LSLE=FALSE). In one embodiment, the link control activates the transmitters (TX_Active=TRUE) for the optical module.

The link control can determine which channel or channels to test, or on which to perform auto-setting. Thus, the link control selects a channel, which transitions state machine 700 from LAS0 to LAS1. At LAS 1, the link control can disable all transmitters except for the channel of interest (the selected channel). Additionally, the link control can then enable the low-speed pattern generator and the low-speed path selection for the channel of interest (TX_LSPG_en=TRUE and TX_LS_SEL=TRUE). In one embodiment, the link control leaves the low-speed pulse signal disabled (TX_LSLE=FALSE).

In one embodiment, when an overflow condition occurs at the transmitter and receiver for the selected channel (TX_Overflow=TRUE & RX_Overflow=TRUE), the link control transitions from LAS1 to LAS2. In one embodiment, the overflow conditions, as indicated by an Overflow signal or other indicator, indicate that the low-speed logic within the transmitter and receiver are ready (e.g., LSPG 410 of transmitter 400 and LSAD 560 of receiver 500).

In LAS2, the receiver itself, or the link controller through signals or logic from the receiver path, determines if a pass or fail indicator has been sent from the other optical module. In one embodiment, a simple one-zero signal can be used, respectively, for pass-fail indication. Thus, in one embodiment, the receiver path tests for a light signal, which can be indicated by a low-speed optical detection (LSOD). In one embodiment, if RX_LSOD=FALSE, the link control causes the transmitter to increase TX_laser_set, resets TX_LSPG, and repeats LAS1 (shown by the arrow from LAS2 to LAS1). In one embodiment, if RX_LSOD=TRUE, the TX path is configured correctly, and the link control transitions from LAS2 to LAS3.

At LAS3, the link control can perform any operations needed to complete configuration of the transmit path or driver path of the selected channel. In one embodiment, the link control then begins the receiver path setting auto-setting (or the other module begins auto-setting of its transmitter on that channel). When the receiver path is receiving an optical test signal and providing feedback, in one embodiment, the receiver path includes amplitude detection logic to test the incoming signal. Thus, in one embodiment, the receiver path tests to see if RX_amp_pass=FALSE, in which case the link control can remain in LAS3 until a passing signal is received.

When RX_amp_pass=TRUE, the link control can transition to LAS4. At this point, the receiver path setting operations are completed, and the link control can cause the sending of a pass indicator to the other optical module. It will be understood that the operations at LAS3 and LAS4 or their equivalents would be occurring at the other optical module while this optical module is performing LAS0-LAS2. In one embodiment, the link control can transition out of LAS4 after a period of delay, because, for example, the other transmitter could be set to its maximum setting without triggering a pass indicator. In such a case where the link control transitions out of LAS4 without directing a pass indicator to be sent, the link control can generate an error or an error report to flag the fault.

If all channels have been tested, the auto-setting process is completed, and state machine 700 can end. If not all channels have been tested, the operation can return to LAS0, where the link control chooses the next channel and again initiates the testing. In one embodiment, one of the optical modules (the near-end optical module) initiates all testing, including the testing of the transmit path of the far-end optical module.

Figure 8A:
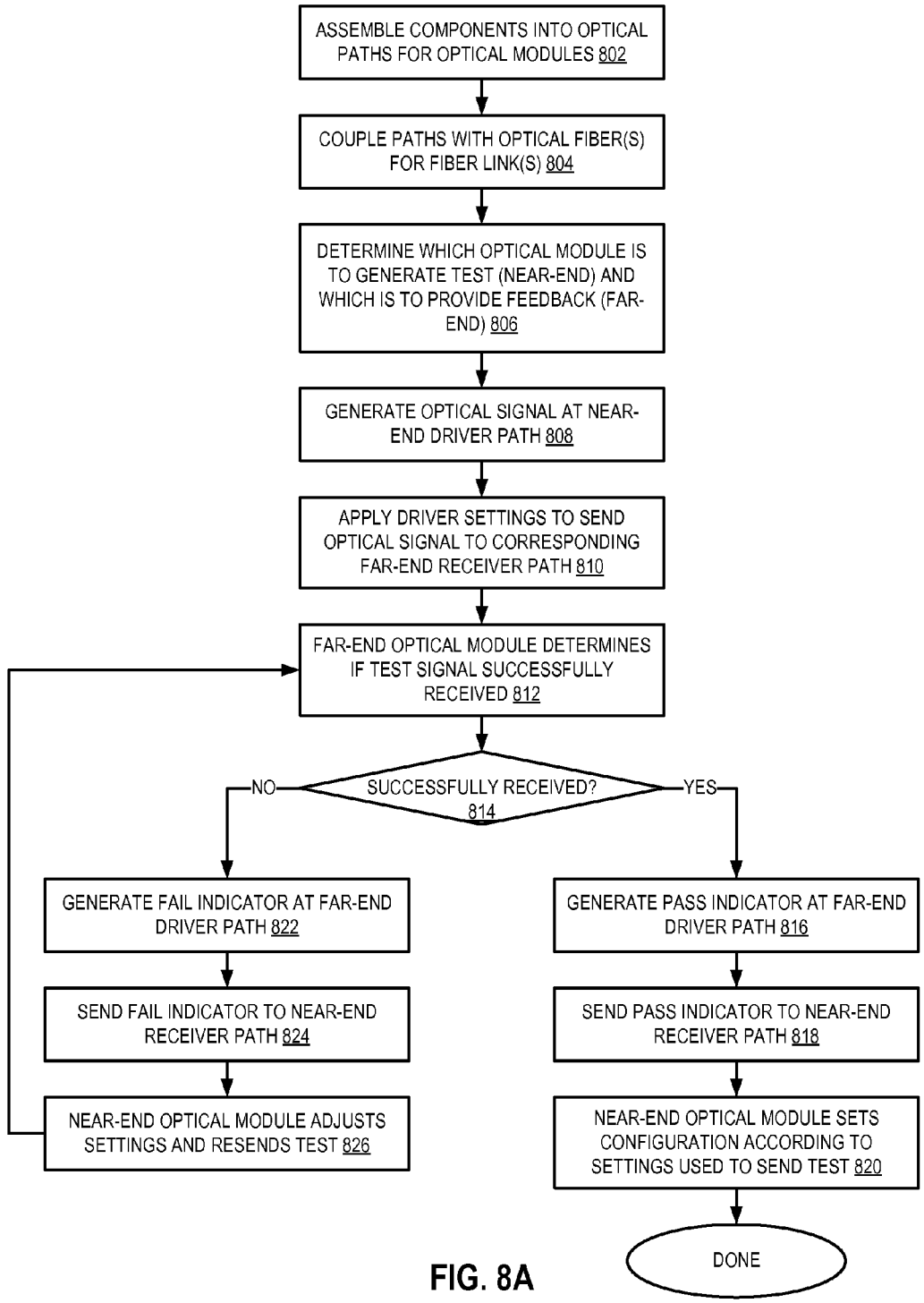
FIG. 8A is a flow diagram of an embodiment of a process for performing link auto-setting of an optical link.

FIG. 8A is a flow diagram of an embodiment of a process for performing link auto-setting of an optical link. The process of FIG. 8A can be performed by an optical module described herein. The optical modules are manufactured by assembling components to make the optical modules, including assembling the optical paths for the optical connections, 802. The optical paths include a link from the transmitter of one module to the receiver of the other module, and vice versa. When the optical modules are completed, a manufacturing entity can couple the optical paths between the modules with optical fiber for one or more fiber link connections, 804.

The modules can then be configured to perform auto-setting of the optical links. The modules can be configured via programming from a testing or manufacturing entity, or can be pre-programmed to perform the auto-setting (e.g., at initial start-up). In one embodiment, the optical modules determine which optical module is to control the test and which is to provide feedback, 806. The module providing the test signal can be designated the near-end module, while the module providing feedback can be designated the far-end module. The determination can be made by the modules, for example, during handshaking.

The near-end module generates an optical signal with a test pattern with a near-end driver or transmitter path, 808. The near-end module applies driver settings to send the optical signal to a corresponding far-end receiver path, 810. The far-end module determines if the test signal is successfully received, 812.

If the test signal is not successfully received, 814 NO branch, the far-end module generates a fail indicator at a driver path, 822. The driver path can be part of the same or a different optical channel. The far-end module sends the fail indicator to the near-end receiver path, 824. In response to the fail indicator, the near-end optical module adjusts the settings of its driver path and resends the test, 826. For example, the link control can generate a new value of a laser driver set signal that controls the operation of the driver path. The process of sending and testing the signal can continue until the driver path of the near-end module is configured properly, or until a fault occurs (not explicitly shown).

If the test signal is successfully received, 814 YES branch, the far-end module generates a pass indicator at the driver path, 816. The far-end module sends the pass indicator to the near-end receiver path, 818. The near-end optical module sets or keeps its driver configuration according to the settings used to send the successful test signal, 820. The process of auto-configuration for the link can then end. The process can be repeated at the far-end module for the link between the far-end transmitter and near-end receiver. The test can also be repeated for other links.

Figure 8B:
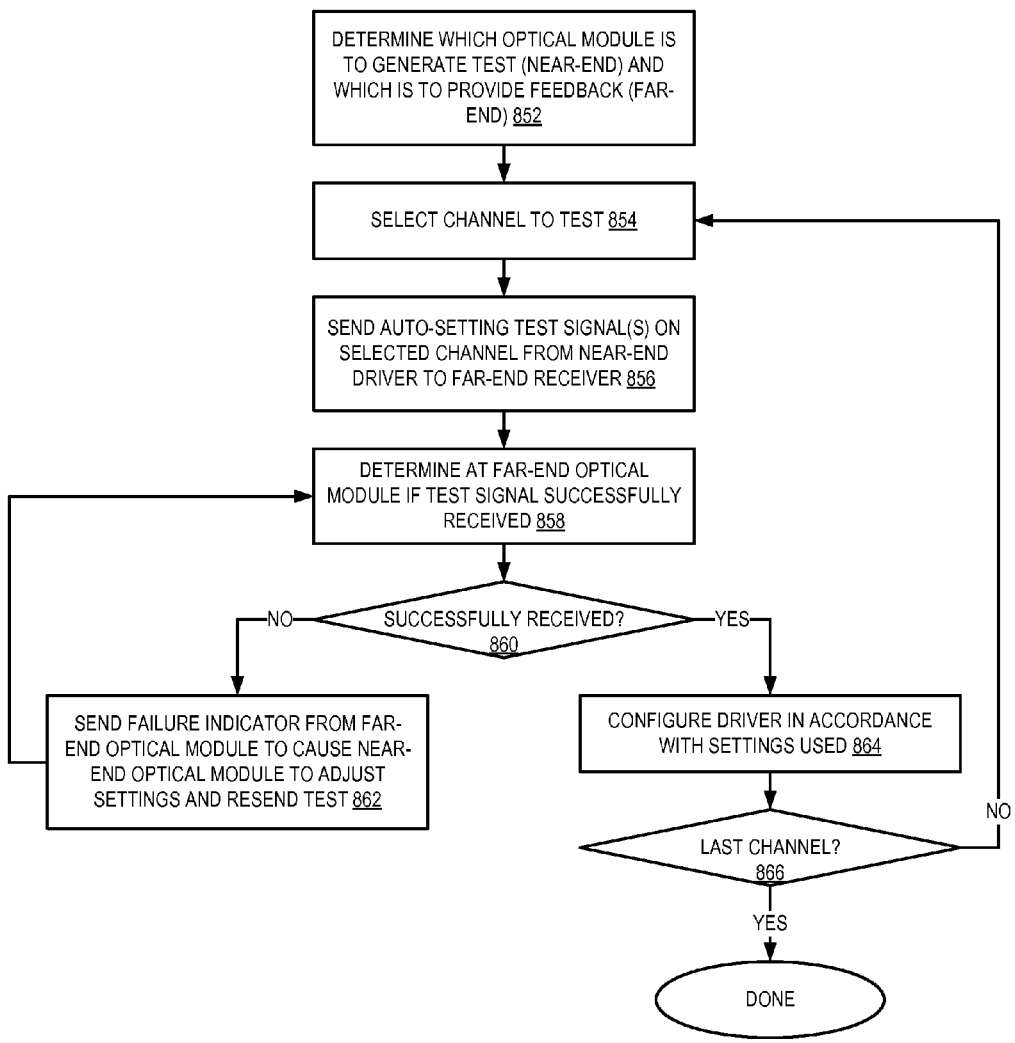
FIG. 8B is a flow diagram of an embodiment of a process for performing link auto-setting of a channel in a multi-channel system.

FIG. 8B is a flow diagram of an embodiment of a process for performing link auto-setting of a channel in a multi-channel system. The operations in FIG. 8B can be performed by an optical module having multiple channels described herein. In one embodiment, two optical modules with multiple optical channels between them can determine which optical module is to generate the test (designated the near-end module) and which is to provide feedback (designated the far-end module), 852. The link control of the near-end module selects one of the channels to test, 854. The link control causes the driver path of the near-end optical module to send an auto-setting test signal on the selected channel to the far-end receiver, 856.

The far-end module determines if the test signal is successfully received, 858. If the signal is not successfully received, 860 NO branch, the far-end optical module sends a failure indicator from its driver path to the near-end receiver path to cause the near-end driver path to adjust the settings and resend the test, 862. The process can repeat at 858 until the signal is successfully received or an exception occurs (e.g., a timeout).

If the signal is successfully received at the far-end receiver path, 860 YES branch, the near-end optical module configures its driver path in accordance with the settings used to send the successful test signal, 864. In one embodiment, the link control determines whether all channels have been tested, and if not, 866 NO branch, the link control selects a new channel and repeats the process. If all channels have performed auto-setting, 866 YES branch, the process can complete.

Figure 9A:
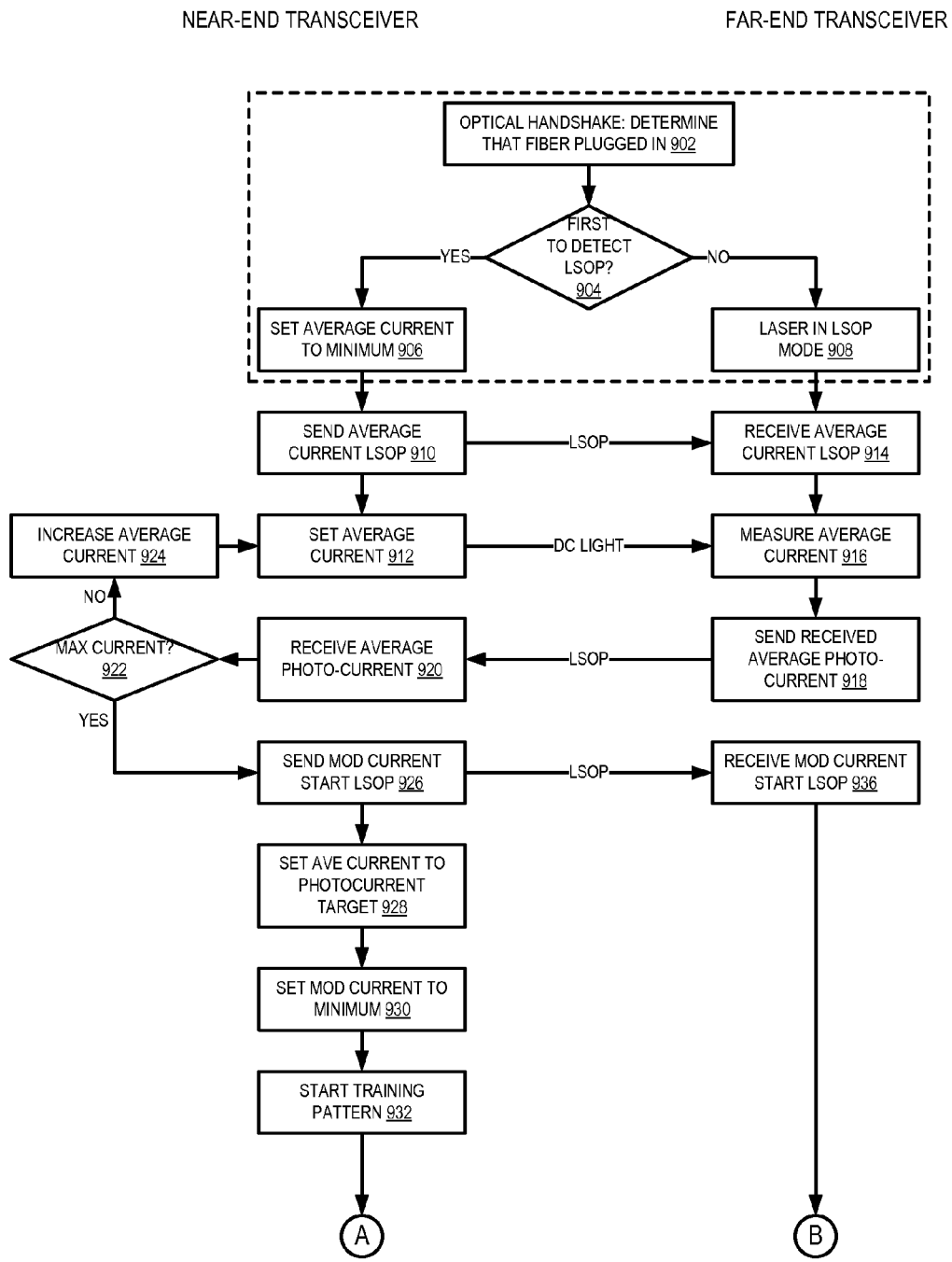
FIGS. 9A-9B illustrate a flow diagram of an embodiment of a process for performing auto-link setting using a low-speed optical pulse.
Figure 9B:
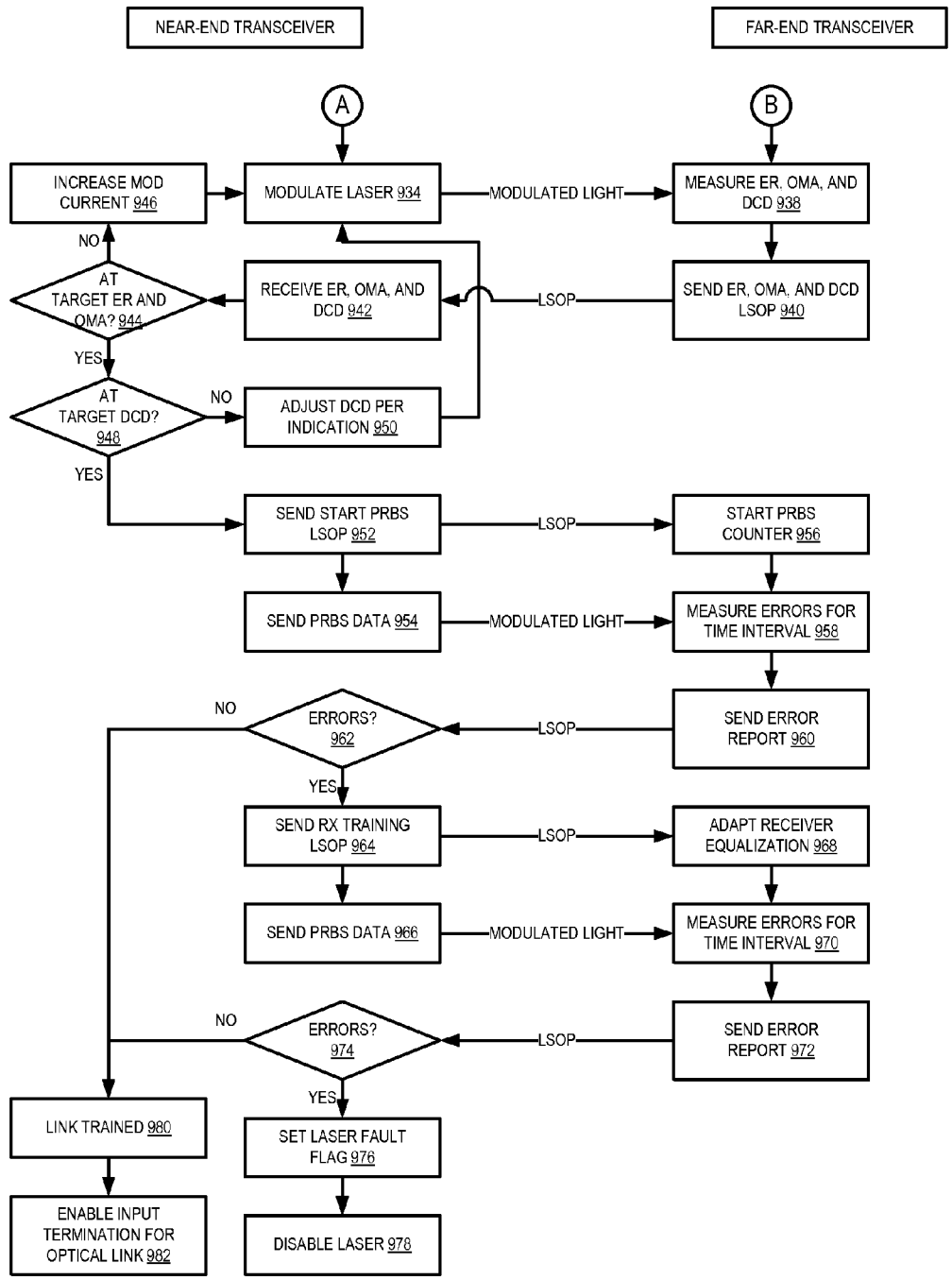

FIGS. 9A-9B illustrate a flow diagram of an embodiment of a process for performing auto-link setting using a low-speed optical pulse. Starting in FIG. 9A, a near-end transceiver or module and a far-end transceiver or module engage in a handshake and link auto-setting process. Both the near-end and far-end transceivers perform the operations within the dashed box, waiting to perform the auto-setting. It will be understood that the designation of near-end and far-end can be arbitrary. In one embodiment, the near-end designation is given to a link that first detects a signal, and the other transceiver becomes the far-end transceiver for the auto-setting.

Thus, each transceiver performs an optical handshake to determine that a fiber is plugged in to the device, 902. In one embodiment, if the transceiver is the first to detect a low-speed optical pulse (LSOP), 904 YES branch, the transceiver is the near-end transceiver, and sets its transmitter average current to a minimum level, 906. If the transceiver is not the first to detect the LSOP, 904 NO branch, the transceiver is the far-end transceiver, and places its laser in LSOP mode, 908. The LSOP mode can be used to provide feedback back to the near-end transceiver.

In one embodiment, the near-end transceiver sends an average current LSOP, 910, which is received at the far-end transceiver, 914. The signal can indicate a value used by the near-end transceiver. The near-end transceiver can set its average current, 912, and send a DC light signal to the far-end transceiver. The far-end transceiver receives the signal and measures the average current, 918. The far-end transceiver can send back an indication of an average photocurrent generated by the DC light signal, 918. Such a feedback signal can be sent with an LSOP signal. The near-end transceiver receives the measured average photocurrent from the far-end transceiver, 920. In one embodiment, the near-end transceiver determines if its current setting is at a maximum current, 922.

If not, 922 NO branch, the near-end transceiver increases its average transmit current, 924, and repeats setting the average current, 912, and sending a DC light signal with that setting. The transceivers can thus sweep up the DC light settings for the near-end transceiver to find a setting that produces a target average photocurrent from the far-end transceiver. The transceivers can also sweep the DC light to determine the DC light setting for the maximum optical power for eye safety classification target.

When the near-end transceiver average current setting is at the maximum, 922 YES branch, the near-end transceiver can send a modulation current start LSOP, 926. The far-end transceiver receives the modulation current start LSOP, 936, to initiate a test of the modulation current. As mentioned above, the near-end transceiver can determine what setting of its average current generates a desired or target average photocurrent in the far-end transceiver. Thus, the near-end transceiver can set its average current based on the photocurrent target, 928. In one embodiment, the near-end transceiver then sets its modulation current to a minimum, 930, and starts a training pattern or test signal, 932.

Referring now to FIG. 9B, the near-end transceiver modulates a laser signal, 934, with the setting for the modulation current, and sends a modulated light signal to the far-end transceiver. The far-end transceiver receives the signal, and can perform one or more tests on the signal, such as measuring an error rate (ER), optical modulation amplitude (OMA), and/or duty cycle distortion (DCD), 938. Other tests could be performed in addition to, or alternatively to, these tests. The test signal should include a known training pattern that can be detected by the far-end transceiver to determine if the signal was received correctly. Thus, the far-end transceiver can determine an error rate by knowing what signal was sent, and what was decoded from the received signal. The amplitude detection can be performed as described above with respect to system 500.

The far-end transceiver can send an indication of the results of any tests performed with an LSOP signal. Thus, in one embodiment, the far-end transceiver indicates value(s) for ER, OMA, DCD, and/or other tests, 940, which are received at the near-end transceiver, 942. The near-end transceiver can determine if the signal has desired ER and/or OMA, 944. If not, 944 NO branch, the near-end transceiver can increase the modulation current setting, 946, and repeat sending the test signal, 934. If the current level is correct, 944 YES branch, the near-end transceiver can determine if a target duty cycle distortion level has been achieved, 948. If the target DCD level is not achieved, 948 NO branch, the near-end transceiver can adjust the DCD, 950, and resend the modulated training signal, 934. In one embodiment, the near-end transceiver adjusts the DCD based on information in an indicator from the far-end transceiver.

If the target DCD level is achieved, 948 YES branch, the near-end transceiver can initiate a pseudorandom bit sequence (PRBS) test by sending a start PRBS LSOP, 952. The PRBS test can be a secondary check of the quality of the link. It will be understood that certain errors may not be manifested from sending and processing a known training pattern. Thus, in one embodiment, a PRBS test signal can be used to detect corner issues, such as signal drift, missing bits, errors with parity or other error codes, or other errors. The far-end transceiver can start a PRBS counter, 956, to keep a count of errors received. The near-end transceiver sends the PRBS data as modulated light, 954, and the far-end transceiver measures for errors during a specified time interval, 958. The far-end transceiver sends a report indicating any errors, 960.

If there are no errors, 962, NO branch, the laser can be considered trained, 980, and the input enabled for use of the optical link, 982. For example, an input termination such as 422 of FIG. 4 can be enabled for an appropriate optical transmission scheme used by the optical transceivers. If there are errors, 962, YES branch, the auto-setting can attempt to adjust an operation of the receiver to determine if the errors can be corrected, and send a receiver training LSOP, 964. It will be understood that while description is made to whether there are or are not errors (at 962), the test could be for a threshold level of errors. For example, a certain number of errors more than zero could be considered acceptable in some implementations. Alternatively, any number of errors over zero is considered a test fail.

In response to starting receiver training, the far-end transceiver could adapt one or more settings that affect receiver equalization, 968, to attempt to improve the receive processing of the signal. The near-end transceiver can repeat the PRBS data transmission, 966, and allow the far-end transceiver to measure for errors during a time interval, 970. The far-end transceiver again sends an error report, 972, and the near-end transceiver can again determine if the number of errors is acceptable, 974. If the number of errors is acceptable, 974 NO branch, the link is trained, 980. If there are errors, 974 YES branch, the near-end transceiver can set a laser fault flag or other error flag, 976, and disable the laser, 978, and/or take other remedial action.

Figure 10:
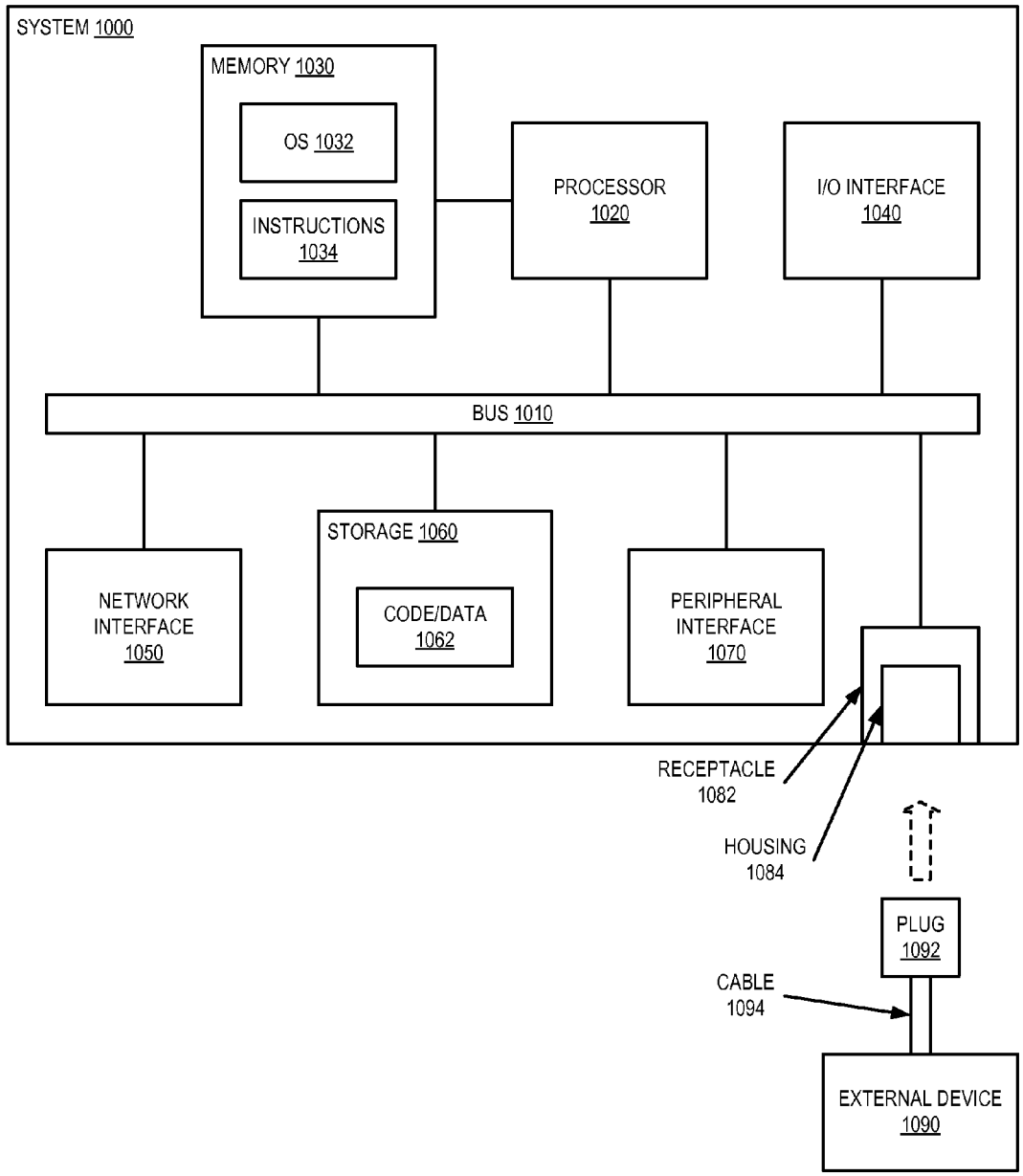
FIG. 10 is a block diagram of an embodiment of a computing system in which link auto-setting can be implemented.

FIG. 10 is a block diagram of an embodiment of a computing system in which link auto-setting can be implemented. System 1000 represents a computing device in accordance with any embodiment described herein, and can be a laptop computer, a desktop computer, a server, a gaming or entertainment control system, a scanner, copier, printer, router or switching device, or other electronic device. System 1000 includes processor 1020, which provides processing, operation management, and execution of instructions for system 1000. Processor 1020 can include any type of microprocessor, central processing unit (CPU), processing core, or other processing hardware to provide processing for system 1000. Processor 1020 controls the overall operation of system 1000, and can be include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 1030 represents the main memory of system 1000, and provides temporary storage for code to be executed by processor 1020, or data values to be used in executing a routine. Memory 1030 can include one or more memory devices such as read-only memory (ROM), flash memory, one or more varieties of random access memory (RAM), or other memory devices, or a combination of such devices. Memory 1030 stores and hosts, among other things, operating system (OS) 1032 to provide a software platform for execution of instructions in system 1000. Additionally, other instructions 1034 are stored and executed from memory 1030 to provide the logic and the processing of system 1000. OS 1032 and instructions 1034 are executed by processor 1020.

Processor 1020 and memory 1030 are coupled to bus/bus system 1010. Bus 1010 is an abstraction that represents any one or more separate physical buses, communication lines/interfaces, and/or point-to-point connections, connected by appropriate bridges, adapters, and/or controllers. Therefore, bus 1010 can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire"). The buses of bus 1010 can also correspond to interfaces in network interface 1050.

System 1000 also includes one or more input/output (I/O) interface(s) 1040, network interface 1050, one or more internal mass storage device(s) 1060, and peripheral interface 1070 coupled to bus 1010. I/O interface 1040 can include one or more interface components through which a user interacts with system 1000 (e.g., video, audio, and/or alphanumeric interfacing). Network interface 1050 provides system 1000 the ability to communicate with remote devices (e.g., servers, other computing devices) over one or more networks. Network interface 1050 can include an Ethernet adapter, wireless interconnection components, USB (universal serial bus), or other wired or wireless standards-based or proprietary interfaces.

Storage 1060 can be or include any conventional medium for storing large amounts of data in a nonvolatile manner, such as one or more magnetic, solid state, or optical based disks, or a combination. Storage 1060 hold code or instructions and data 1062 in a persistent state (i.e., the value is retained despite interruption of power to system 1000). Storage 1060 can be generically considered to be a "memory," although memory 1030 is the executing or operating memory to provide instructions to processor 1020. Whereas storage 1060 is nonvolatile, memory 1030 can include volatile memory (i.e., the value or state of the data is indeterminate if power is interrupted to system 1000).

Peripheral interface 1070 can include any hardware interface not specifically mentioned above. Peripherals refer generally to devices that connect dependently to system 1000. A dependent connection is one where system 1000 provides the software and/or hardware platform on which operation executes, and with which a user interacts.

In one embodiment, system 1000 can include one or more receptacles 1082 with housing 1084 to receive plug 1092 or mate with plug 1092 to connect to external device 1090. Receptacle 1082 includes housing 1084, which provides the mechanical connection mechanisms. As used herein, mating one connector with another refers to providing a mechanical connection. The mating of one connector with another typically also provides a communication connection. Receptacle 1082 can connect directly to one or more buses of bus system 1010, or receptacle 1082 can be associated directly with one or more devices, such as network interface 1050, I/O interface 1040, storage 1060, peripheral interface 1070, or processor 1020.

Plug 1092 is a connector plug that allows external device 1090 (which can be any of the same types of devices discussed above) to interconnect with device 1000. Alternatively, external device 1090 could be a router or switch component. Plug 1092 can be directly built into external device 1090 (with or without a cord or cable 1094), or can be interconnected to external device 1090 via a standalone cable 1094. In one embodiment, plug 1092 supports communication via an optical interface or both an optical interface and an electrical interface. The interconnection of receptacle 1082 to bus 1010 can similarly include an optical path or both an optical and electrical signal path. Receptacle 1082 can also include an optical communication connection that is converted to an electrical signal prior to being placed on bus 1010.

In one embodiment, one or more components of system 1000 include an optical interface. The optical components can interface with one or more other components internally to system 1000, and/or with one or more external devices 1090 via receptacle(s) 1082. Receptacle 1082 provides the hardware port through which external optical signals can be exchanged, for example, with peripheral devices. In one embodiment, the optical interfaces can include optical connections that perform auto-setting in accordance with any embodiment described herein.

Figure 11:
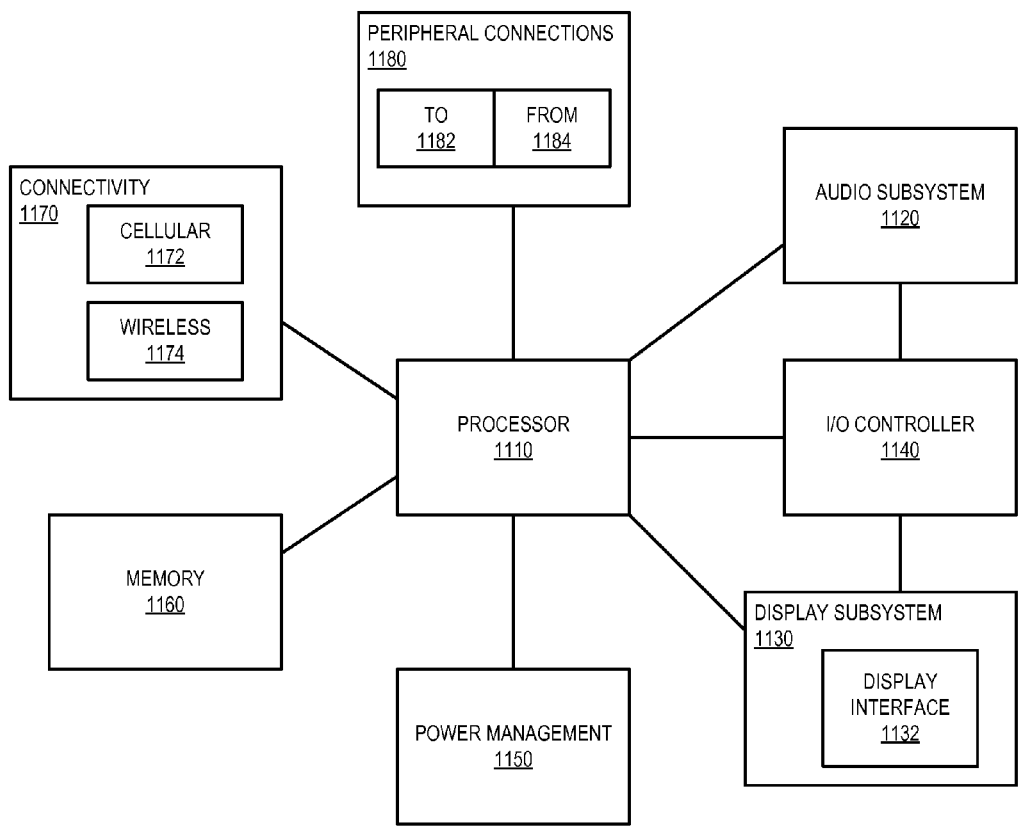
FIG. 11 is a block diagram of an embodiment of a mobile device in which link auto-setting can be implemented.

FIG. 11 is a block diagram of an embodiment of a mobile device in which link auto-setting can be implemented. Device 1100 represents a mobile computing device, such as a computing tablet, a mobile phone or smartphone, a wireless-enabled e-reader, or other mobile device. It will be understood that certain of the components are shown generally, and not all components of such a device are shown in device 1100.

Device 1100 includes processor 1110, which performs the primary processing operations of device 1100. Processor 1110 can include one or more physical devices, such as microprocessors, application processors, microcontrollers, programmable logic devices, or other processing means. The processing operations performed by processor 1110 include the execution of an operating platform or operating system on which applications and/or device functions are executed. The processing operations include operations related to I/O (input/output) with a human user or with other devices, operations related to power management, and/or operations related to connecting device 1100 to another device. The processing operations can also include operations related to audio I/O and/or display I/O.

In one embodiment, device 1100 includes audio subsystem 1120, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into device 1100, or connected to device 1100. In one embodiment, a user interacts with device 1100 by providing audio commands that are received and processed by processor 1110.

Display subsystem 1130 represents hardware (e.g., display devices) and software (e.g., drivers) components that provide a visual and/or tactile display for a user to interact with the computing device. Display subsystem 1130 includes display interface 1132, which includes the particular screen or hardware device used to provide a display to a user. In one embodiment, display interface 1132 includes logic separate from processor 1112 to perform at least some processing related to the display. In one embodiment, display subsystem 1130 includes a touchscreen device that provides both output and input to a user.

I/O controller 1140 represents hardware devices and software components related to interaction with a user. I/O controller 1140 can operate to manage hardware that is part of audio subsystem 1120 and/or display subsystem 1130. Additionally, I/O controller 1140 illustrates a connection point for additional devices that connect to device 1100 through which a user might interact with the system. For example, devices that can be attached to device 1100 might include microphone devices, speaker or stereo systems, video systems or other display device, keyboard or keypad devices, or other I/O devices for use with specific applications such as card readers or other devices.

As mentioned above, I/O controller 1140 can interact with audio subsystem 1120 and/or display subsystem 1130. For example, input through a microphone or other audio device can provide input or commands for one or more applications or functions of device 1100. Additionally, audio output can be provided instead of or in addition to display output. In another example, if display subsystem includes a touchscreen, the display device also acts as an input device, which can be at least partially managed by I/O controller 1140. There can also be additional buttons or switches on device 1100 to provide I/O functions managed by I/O controller 1140.

In one embodiment, I/O controller 1140 manages devices such as accelerometers, cameras, light sensors or other environmental sensors, gyroscopes, global positioning system (GPS), or other hardware that can be included in device 1100. The input can be part of direct user interaction, as well as providing environmental input to the system to influence its operations (such as filtering for noise, adjusting displays for brightness detection, applying a flash for a camera, or other features).

In one embodiment, device 1100 includes power management 1150 that manages battery power usage, charging of the battery, and features related to power saving operation. Memory subsystem 1160 includes memory device(s) for storing information in device 1100. Memory 1160 can include nonvolatile (state does not change if power to the memory device is interrupted) and/or volatile (state is indeterminate if power to the memory device is interrupted) memory devices. Memory 1160 can store application data, user data, music, photos, documents, other data, as well as system data (whether long-term or temporary) related to the execution of the applications and functions of system 1100.

Connectivity 1170 includes hardware devices (e.g., wireless and/or wired connectors and communication hardware) and software components (e.g., drivers, protocol stacks) to enable device 1100 to communicate with external devices. The device could be separate devices, such as other computing devices, wireless access points or base stations, as well as peripherals such as headsets, printers, or other devices.

Connectivity 1170 can include multiple different types of connectivity. To generalize, device 1100 is illustrated with cellular connectivity 1172 and wireless connectivity 1174. Cellular connectivity 1172 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 1174 refers to wireless connectivity that is not cellular, and can include personal area networks (such as Bluetooth), local area networks (such as WiFi), and/or wide area networks (such as WiMax), or other wireless communication. Wireless communication refers to transfer of data through the use of modulated electromagnetic radiation through a non-solid medium. Wired communication (including optical communication) occurs through a solid communication medium.

Peripheral connections 1180 include hardware interfaces and connectors, as well as software components (e.g., drivers, protocol stacks) to make peripheral connections. It will be understood that device 1100 could both be a peripheral device ("to" 1182) to other computing devices, as well as have peripheral devices ("from" 1184) connected to it. Device 1100 commonly has a "docking" connector to connect to other computing devices for purposes such as managing (e.g., downloading and/or uploading, changing, synchronizing) content on device 1100. Additionally, a docking connector can allow device 1100 to connect to certain peripherals that allow device 1100 to control content output, for example, to audiovisual or other systems.

In addition to a proprietary docking connector or other proprietary connection hardware, device 1100 can make peripheral connections 1180 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

Any of the interconnections or I/O can be performed optically. Thus, I/O controller 1140, display subsystem 1130, memory 1160, connectivity 1170, and/or peripheral connections 1180 can have an optical connection with processor 1110 or with an external component. In the case of an optical connection, the optical connections can be set with autosetting in accordance with any embodiment described herein.

In one aspect, an optical module includes a driver path including hardware components to drive a laser device, the driver path to generate an optical signal to send to a separate optical module over an optical transmit path, the optical signal including a test pattern, the sending the optical signal performed in accordance with a transmit current setting; and a receiver path including a light detection device and processing components, the receiver path to receive an indicator from the separate optical module to indicate whether the test pattern was successfully received at the separate optical module, wherein if the test pattern was not successfully received, the driver path is configured to increase the transmit current setting, and generate the optical signal in accordance with the increased transmit current setting to send to the separate optical module; otherwise, the driver path is configured to configure the transmit path with the transmit current setting for communication with the separate optical module.

In one embodiment, the driver path is to generate a low-speed optical signal with the test pattern, wherein the low-speed signal is at least an order of magnitude slower than an operational speed of the optical module. In one embodiment, the driver path includes low-speed signal generation components multiplexed onto the transmit path with components that generate data for the operational speed signal. In one embodiment, the transmit path is to generate the optical signal with the transmit current set to a default smallest value modulation current for the optical module. In one embodiment, the transmit path is a first transmit path and the receiver path is a second receiver path, wherein the optical module includes a first transmit path and first receiver path pair for a first optical channel, and a second transmit path and second receiver path pair for a second optical channel, wherein the optical signal with the test pattern is sent on the first optical channel, and the indicator is received on the second optical channel. In one embodiment, the indicator further include a pattern that indicates a specific setting change to make in the transmit path.

In one aspect, a method in an optical module includes sending an optical signal from a first optical module to a second optical module over an optical transmit path, the optical signal including a test pattern, the sending the optical signal performed in accordance with a transmit current setting; receiving an indicator from the second optical module to indicate whether the test pattern was successfully received at the second optical module, and if the test pattern was not successfully received, increasing the transmit current setting, and resending the optical signal in accordance with the increased transmit current setting; otherwise, configuring the transmit path with the transmit current setting for communication with the second optical module.

In one embodiment, sending the optical signal comprises sending a low-speed optical signal with the test pattern, wherein the low-speed signal is at least an order of magnitude slower than an operational speed of the optical module. In one embodiment, sending the low-speed optical signal comprises multiplexing the low-speed signal onto the transmit path, where components that generate data for the operational speed signal and components that generate the low-speed optical signal share the data path. In one embodiment, sending the optical signal with the transmit current setting comprises sending the optical signal with transmit current set to a default smallest value modulation current for the optical module. In one embodiment, sending the optical signal comprises sending the optical signal on a first optical channel including a first transmit path and receive path pair, and wherein receiving the indicator comprises receiving the indicator on a receive path of a different optical channel having a different transmit path and receive path pair. In one embodiment, receiving the indicator comprises receiving an indication pattern that indicates a specific setting change to make in the transmit path.

In one aspect, an optical module includes a receiver path including a light detection device and processing components, the receiver path to receive an optical signal from a separate optical module over an optical receive path, the optical signal including a test pattern, the optical signal sent by the separate optical module in accordance with a transmit current setting; logic to determine if the test pattern is received correctly; and a driver path including hardware components to drive a laser device, the driver path to generate an indicator to send to the separate optical module to indicate whether the test pattern was successfully received, where if the indicator indicates the test pattern was successfully received, the indicator configured to cause the separate optical module to increase the transmit current setting, and resend the optical signal in accordance with the increased transmit current setting; otherwise, the indicator configured to cause the separate optical module to configure its communications in accordance with the transmit current setting.

In one embodiment, the optical signal comprises a low-speed optical signal with the test pattern, wherein the low-speed signal is at least an order of magnitude slower than an operational speed of the optical module. In one embodiment, the transmit current setting comprises a default smallest value modulation current for the optical module. In one embodiment, the receiver path is a first receiver path and the transmit path is a second transmit path, wherein the optical module includes a first transmit path and first receiver path pair for a first optical channel, and a second transmit path and second receiver path pair for a second optical channel, wherein the optical signal with the test pattern is received on the first optical channel, and the indicator is sent on the second optical channel. In one embodiment, the logic is to determine if the test pattern was received correctly by testing an amplitude of the received signal. In one embodiment, the logic is part of the receiver path.

In one aspect, a system includes a near-end optical module coupled to a far-end optical module via optical links, the near-end optical module and the far-end optical module to perform link auto-setting of the optical links; the near-end optical module including a near-end driver path including hardware components to drive a laser device, the driver path to generate an optical signal to send to the far-end optical module over one of the optical links, the optical signal including a test pattern, the sending the optical signal performed in accordance with a transmit current setting; and a near-end receiver path including a light detection device and processing components, the receiver path to receive an indicator from the far-end optical module to indicate whether the test pattern was successfully received at the far-end optical module, the far-end optical module including a far-end receiver path including a light detection device and processing components, the receiver path to receive the optical signal from the near-end optical module over the one optical link; logic to determine if the test pattern is received correctly; and a far-end driver path including hardware components to drive a laser device, the driver path to generate the indicator to indicate whether the test pattern was successfully received, wherein if the test pattern was not successfully received, the near-end optical module is configured to increase the transmit current setting, and resend the optical signal in accordance with the increased transmit current setting; otherwise, the near-end optical module is configured to configure the near-end driver path with the transmit current setting for communication with the far-end optical module.

In one embodiment, the optical signal comprises a low-speed optical signal with the test pattern, wherein the low-speed signal is at least an order of magnitude slower than an operational speed of the optical module. In one embodiment, the optical links include multiple channels, where the near-end driver path and the far-end receiver path are connected via an optical link of a first channel, and the far-end driver path and near-end receiver path are connected via an optical link of a second channel different from the first channel. In one embodiment, after the test pattern is successfully received on the optical link of the first channel, the near-end optical module and the far-end optical module are configured to perform auto-setting of the optical link of the second channel. In one embodiment, the near-end optical module and the far-end optical module are configured to iteratively test each link of the multiple channels by iteratively exchanging optical signals with the test pattern and indicator signals.

Flow diagrams as illustrated herein provide examples of sequences of various process actions. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. An optical module comprising:
a driver path including hardware components to drive a laser device, the driver path to generate an optical signal to send to a separate optical module over an optical transmit path, the optical signal including a test pattern, the sending the optical signal performed in accordance with a transmit current setting, wherein the driver path comprises:
a low-speed pattern generator;
a multiplexer coupled to receive an electrical signal from the low-speed pattern generator, wherein the test pattern is based on the electrical signal, the multiplexer further coupled to receive data via one or more input paths; and
an input termination circuit coupled to the one or more input paths;
wherein a data rate of the optical signal including the test pattern is at least an order of magnitude slower than a data rate of an operational mode of the optical module; and
a receiver path including a light detection device and processing components, the receiver path to receive an indicator from the separate optical module to indicate whether the test pattern was successfully received at the separate optical module,
wherein if the test pattern was not successfully received, the driver path to increase the transmit current setting, and generate the optical signal in accordance with the increased transmit current setting to send to the separate optical module while the multiplexer is configured to provide an output based on the electrical signal from the low-speed pattern generator; otherwise, the driver path to configure the transmit current setting for communication with the separate optical module, to configure the one or more input paths with the input termination circuit to provide communication of the data to the multiplexer, and to configure the multiplexer to output signals based on the data received via one or more input paths.

2. The optical module of claim 1, wherein the transmit path is to generate the optical signal with the transmit current set to a default smallest value modulation current for the optical module.

3. The optical module of claim 1, wherein the transmit path is a first transmit path and the receiver path is a second receiver path, wherein the optical module includes a first transmit path and first receiver path pair for a first optical channel, and a second transmit path and second receiver path pair for a second optical channel, wherein the optical signal with the test pattern is sent on the first optical channel, and the indicator is received on the second optical channel.

4. The optical module of claim 1, wherein the indicator further comprises a pattern that indicates a specific setting change to make in the transmit path.

5. A method in an optical module, comprising:
receiving at a multiplexer an electrical signal from a low-speed pattern generator;
providing an output from the multiplexer based on the electrical signal from the low-speed pattern generator, wherein the output is provided while an input termination circuit is configured to prevent the multiplexer from receiving data via one or more input paths;
based on the output from the multiplexer, sending an optical signal from a first optical module to a second optical module over an optical transmit path, the optical signal including a test pattern, the sending the optical signal performed in accordance with a transmit current setting, wherein a data rate of the optical signal including the test pattern is at least an order of magnitude slower than a data rate of an operational mode of the first optical module;
receiving an indicator from the second optical module to indicate whether the test pattern was successfully received at the second optical module, and
if the test pattern was not successfully received, increasing the transmit current setting, and resending the optical signal in accordance with the increased transmit current setting; otherwise:
configuring the transmit current setting for communication with the second optical module;
configuring the one or more input paths with the input termination circuit to provide communication of the data to the multiplexer; and
configuring the multiplexer to output signals based on the data.

6. The method of claim 5, wherein sending the optical signal with the transmit current setting comprises sending the optical signal with transmit current set to a default smallest value modulation current for the optical module.

7. The method of claim 5, wherein sending the optical signal comprises sending the optical signal on a first optical channel including a first transmit path and receive path pair, and wherein receiving the indicator comprises receiving the indicator on a receive path of a different optical channel having a different transmit path and receive path pair.

8. The method of claim 5, wherein receiving the indicator comprises receiving an indication pattern that indicates a specific setting change to make in the transmit path.

9. A system comprising:
a near-end optical module coupled to a far-end optical module via optical links, the near-end optical module and the far-end optical module to perform link auto-setting of the optical links;
the near-end optical module including
a near-end driver path including hardware components to drive a laser device, the driver path to generate an optical signal to send to the far-end optical module over one of the optical links, the optical signal including a test pattern, the sending the optical signal performed in accordance with a transmit current setting, wherein the near-end driver path comprises:
a low-speed pattern generator;
a multiplexer coupled to receive an electrical signal from the low-speed pattern generator, wherein the test pattern is based on the electrical signal, the multiplexer further coupled to receive data via one or more input paths; and an input termination circuit coupled to the one or more input paths;

wherein a data rate of the optical signal including the test pattern is at least an order of magnitude slower than a data rate of an operational mode of the optical module; and a near-end receiver path including a light detection device and processing components, the receiver path to receive an indicator from the far-end optical module to indicate whether the test pattern was successfully received at the far-end optical module, the far-end optical module including a far-end receiver path including a light detection device and processing components, the receiver path to receive the optical signal from the near-end optical module over the one optical link;

logic to determine if the test pattern is received correctly; and a far-end driver path including hardware components to drive a laser device, the driver path to generate the indicator to indicate whether the test pattern was successfully received, wherein if the test pattern was not successfully received, the near-end optical module to increase the transmit current setting, and resend the optical signal in accordance with the increased transmit current setting while the multiplexer is configured to provide an output based on the electrical signal from the low-speed pattern generator; otherwise, the near-end optical module to configure the transmit current setting for communication with the far-end optical module, to configure the one or more input paths with the input termination circuit to provide communication of the data to the multiplexer, and to configure the multiplexer to output signals based on the data received via one or more input paths.

10. The system of claim 9, wherein the optical links include multiple channels, where the near-end driver path and the far-end receiver path are connected via an optical link of a first channel, and the far-end driver path and near-end receiver path are connected via an optical link of a second channel different from the first channel.

11. The system of claim 10, wherein after the test pattern is successfully received on the optical link of the first channel, the near-end optical module and the far-end optical module are configured to perform auto-setting of the optical link of the second channel.

12. The system of claim 10, wherein the near-end optical module and the far-end optical module are configured to iteratively test each link of the multiple channels by iteratively exchanging optical signals with the test pattern and indicator signals.

* * * * *